United States Patent [19]
Llewellyn et al.

[11] Patent Number: 6,104,920
[45] Date of Patent: Aug. 15, 2000

[54] RADIO COMMUNICATION DEVICE ANTENNA ARRANGEMENTS

[75] Inventors: Ian Paul Llewellyn, Harlow; Martin Stevens Smith, Chelmsford, both of United Kingdom; Steven William Sparksman, Calgary, Canada

[73] Assignee: Nortel Networks Corporation, Montreal, Canada

[21] Appl. No.: 09/048,913

[22] Filed: Mar. 26, 1998

[51] Int. Cl.[7] ....................................................... H04B 1/06
[52] U.S. Cl. ............................ 455/269; 455/575; 455/90; 455/572; 455/270; 343/702
[58] Field of Search ........................... 455/269, 270, 455/572, 351, 90, 575; 343/702, 906, 905

[56] References Cited

U.S. PATENT DOCUMENTS

| 340,389 | 12/1886 | Brown | 455/270 |
| 3,290,601 | 12/1966 | Etal | 343/702 |
| 4,032,723 | 6/1977 | Mendoza | 455/229 |
| 4,507,646 | 3/1985 | Hamlin et al. | 455/270 |
| 4,903,326 | 2/1990 | Zakman et al. | 343/702 |
| 4,920,353 | 4/1990 | Mori et al. | |
| 5,020,136 | 5/1991 | Patsiokas et al. | 455/351 |
| 5,227,805 | 7/1993 | King et al. | 343/702 |
| 5,351,284 | 9/1994 | Rogers | 455/562 |
| 5,710,987 | 1/1993 | Paulick | 455/90 |
| 5,798,984 | 8/1998 | Kock | 368/10 |

FOREIGN PATENT DOCUMENTS

| 0297790 A1 | 1/1989 | European Pat. Off. | 343/702 |
| 0718908 A1 | 6/1996 | European Pat. Off. | 343/702 |
| 340389 | 1/1931 | United Kingdom | 455/270 |

Primary Examiner—Nguyen Vo
Assistant Examiner—Duc Nguyen
Attorney, Agent, or Firm—Lee, Mann, Smith, McWilliams, Sweeney & Ohlson

[57] ABSTRACT

The present invention relates to antenna arrangements for radio communications devices including cordless phone handsets and base stations. The handset includes an antenna arrangement incorporating one or more batteries as part of a monopole structure. The base station includes an antenna arrangement incorporating a low voltage power supply cable. Both handset and base station may also optionally further incorporate an antenna structure located in the split line between their respective casing components.

9 Claims, 5 Drawing Sheets

RADIO COMMUNICATION DEVICE ANTENNA ARRANGEMENTS

FIELD OF THE INVENTION

The present invention relates to radio communications devices particularly but not exclusively cordless phone handset and base station antenna arrangements.

PRIOR ART

Typically a cordless phone system will utilise telescopically extendable aerials on the handset and base station to provide sufficient gain for radio communication therebetween. The use of such protuberances can be inconvenient, catch on objects, be potentially hazardous and aesthetically unpleasing.

The use of pcb tracks used as internal antennas for cordless phone handsets has not been successful at the frequencies used—typically less than 100 MHz.

U.S. Pat. No. 4920353 Mori et al discloses the use of an ultra thin battery forming part of an internal loop antenna in a paging receiver. The battery is preferably bent into a "U" shape, and is at least flat over a part of its length to facilitate its use as a loop antenna. The use of such a special type of battery limits this arrangement's cost effectiveness and convenience in mass produced items. There is also a requirement with loop antennas to have a large area away from the ground plane in order to install the loop where it will not be shorted out to ground.

U.S. Pat. No. 4032723 Mendoza discloses the use of a base station's mains power supply cable as an antenna. Recent restrictions on the pollution of the mains power supply with high frequency components and noise render this system obsolete.

OBJECT OF THE INVENTION

It is an object of the invention to provide improved antenna arrangements for radio communications devices and in particular cordless phone systems.

SUMMARY OF THE INVENTION

In accordance with a first aspect of the present invention, there is provided a radio communications handset comprising:

RF isolating circuitry arranged to isolate RF signals present on a battery from a positive and a negative handset supply terminal;

DC isolating circuitry arranged to isolate DC voltage present on the battery from a handset RF terminal;

transceiver means which is powered from the positive and negative handset supply terminals and which transmits and/or receives RF signals to/from the handset RF terminal;

wherein the battery when fitted is incorporated as part of a monopole antenna arrangement within the handset For the purposes of this specification the term battery means an electrical cell at least partially comprised of a metallic casing.

The handset may be a cordless phone handset, a cellular handset or other type of radio communication handset.

Preferably the RF isolating circuitry comprises an RF isolating inductor and the DC isolating circuitry comprises a DC isolating capacitor.

Preferably the transceiver means comprises a diplexer.

Alternatively the handset further comprises a second internal antenna arrangement.

Preferably the second internal antenna arrangement comprises an antenna element and the handset further comprises at least two casing components joined to form a slit line at said join, at least one said casing component comprising a recess located at said split line which accommodates said antenna element.

In accordance with a second aspect of the present invention there is provided a radio communications base station comprising:

RF isolating circuitry arranged to isolate RF signals present on an LV power supply cable from a positive and a negative base station supply terminal and from a connection at the non-base station end of said cable;

DC isolating circuitry arranged to isolate DC voltage present on the cable from a base station RF terminal;

transceiver means which is powered from the positive and negative handset supply terminals and which transmits and/or receives RF signals to/from the handset RF terminal;

wherein the LV cable when fitted is incorporated as part of an antenna arrangement of the base station.

The base station may be a cordless phone base station, a picocell or microcellular base station, or any other type of radio communications base station using a low voltage cable for power supply.

Preferably the RF isolating circuitry comprises an RF isolating inductor and the DC isolating circuitry comprises a DC isolating capacitor.

Preferably the RF and DC isolating circuitry further comprises RF short circuitry arranged to pass RF signals between two or more cores of said cable.

Preferably the transceiver means comprises a diplexer.

Alternatively the base station further comprises an internal antenna arrangement.

Preferably by the internal antenna arrangement comprises an antenna element and the base station further comprises at least two casing components joined to form a slit line at said join, at least one said casing component comprising a recess located at said split line which accommodates said antenna element.

Preferably said base station further comprises an LV power supply cable. Preferably said cable further comprises a mains voltage adaptor.

In accordance with a third aspect of the present invention there is provided a radio communications handset or base station comprising an antenna element and at least two casing components joined to form a split line at said join, wherein at least one said casing component comprises a recess capable of fully or partially accommodating said element, said recess being located at said split line.

Preferably said Antenna Element is a metallic wire.

In accordance with a further aspect of the present invention there is provided a method of operating a radio communications handset comprising:

a battery;

RF isolating circuitry arranged to isolate RF signals present on the battery from a positive and a negative handset supply terminal;

DC isolating circuitry arranged to isolate DC voltage present on the battery from a handset RF terminal;

transceiver means which is powered from the positive and negative handset supply terminals and which transmits and/or receives RF signals to/from the handset RF terminal;

the method comprising the step of using the battery as part of a monopole antenna arrangement within the handset to receive and/or transmit RF signals.

In accordance with a still further aspect of the present invention there is provided a method of operating a radio communications base station comprising:

a LV power supply cable;

RF isolating circuitry arranged to isolate RF signals present on the LV power supply cable from a positive and a negative base station supply terminal and from a connection at the non-base station end of said cable;

DC isolating circuitry arranged to isolate DC voltage present on the cable from a base station RF terminal;

transceiver means which is powered from the positive and negative handset supply terminals and which transmits and/or receives RF signals to/from the handset RF terminal;

the method comprising the step of using the cable as part of an antenna arrangement for the base station to receive and/or transmit RF signals.

BRIEF DESCRIPTION OF THE DRAWINGS

In order that a greater understanding of the invention can be obtained, embodiments of the invention will now be described with reference to the accompanying drawings, by way of example only and without intending to be limiting, in which.

DETAILED DESCRIPTION

Figure 1:
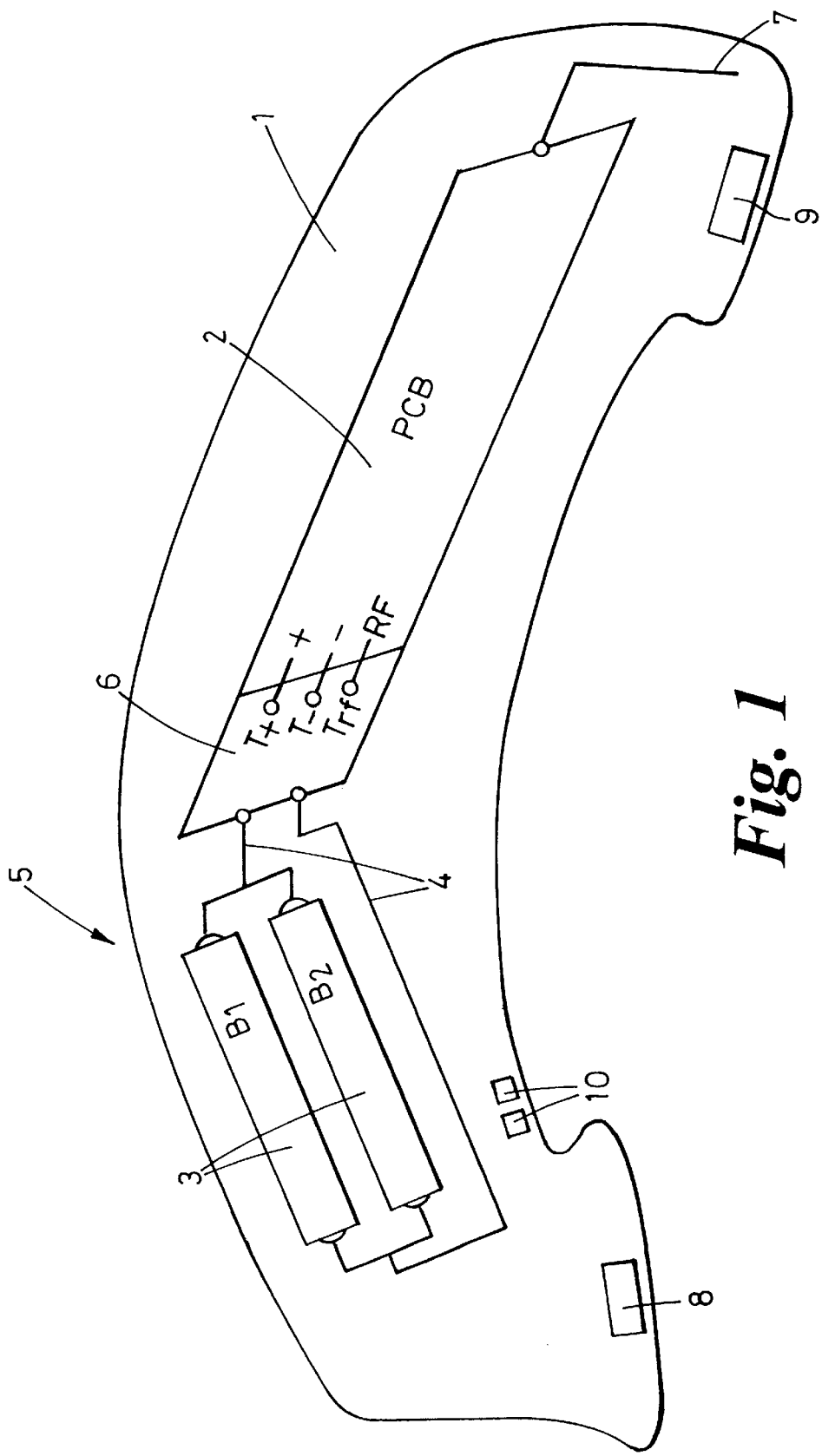
FIG. 1 shows a cordless phone handset antenna arrangement of the invention.

Referring to FIG. 1, a cordless phone handset 1 is there shown comprising a printed circuit board (PCB) 2, RF and DC isolating circuitry 6, two removable batteries 3 and battery leads 4 to the PCB 2. The batteries 3 and leads 4 form an internal monopole antenna arrangement 5. The handset 1 also includes a speaker unit 8, a microphone unit 9, external DC power connectors 10. The preferred handset 1 also includes a second internal antenna 7.

Batteries can be of the type AA, AAA, C, D, 9 volt, handset custom battery packs and any other battery type with an outer metallic casing. Various numbers and combinations of these battery types can also be used.

Figure 2:
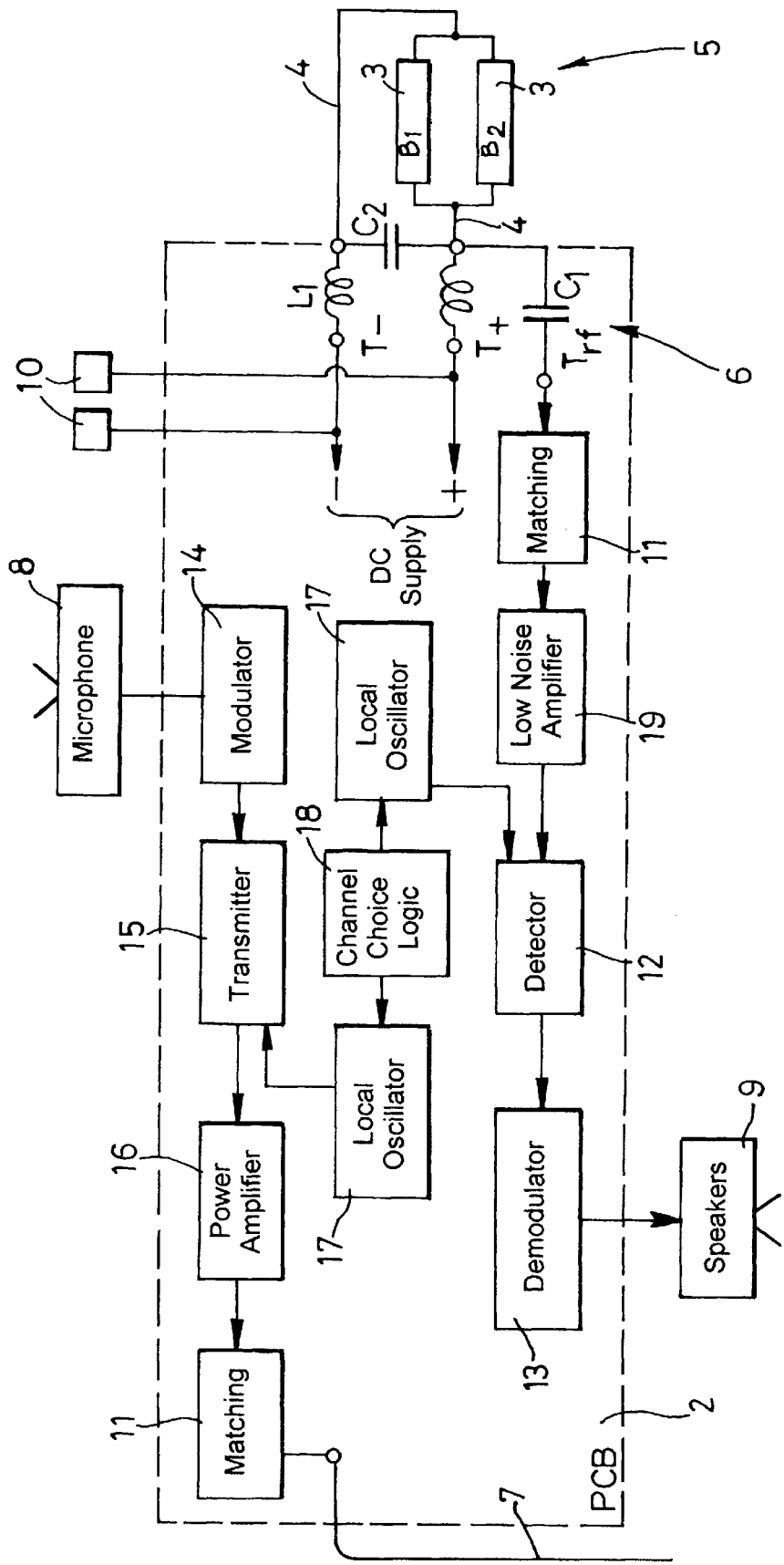
FIG. 2 shows a preferred circuit diagram of the handset antenna arrangement.

FIG. 2 shows a preferred cordless phone handset circuit diagram of the RF and DC isolating circuitry 6 with the batteries 3 installed as part of an antenna arrangement 5. The RF and DC isolating circuitry 6 comprises RF isolating circuitry L1 and L2, and DC isolating circuitry C1 and C2.

The capacitors C1 and C2 are used as high pass filters isolating the battery DC supply from an RF input/output point at terminal $T_{rf}$ on the PCB, but allowing RF signals to pass. This allows the metallic parts of the batteries 3 together with the battery leads 4 to operate as a monopole antenna structure 5.

The inductors L1 and L2 are used as low pass filters allowing the batteries DC supply to pass but isolating RF signals present on the batteries 3 from the handset's DC supply terminals T− and T+.

The use of batteries 3 in the handset as part of the antenna structure 5 allows the prior art external antenna arrangements to be dispensed with. The batteries 3 are inserted and replaced as required to power the handset. No adaption of the batteries 3 is required for their use as part of the antenna 5 as the RF and DC isolating circuitry 6 on the handset's PCB 2 separates the RF and DC components present on the battery to the $T_{rf}$ and T+/T− terminals as appropriate. This also allows the use of standard battery types providing a cost effective handset 1.

The preferred handset 1 also includes cordless phone transceiver circuitry as follows: matching circuitry 11 to each antenna 5 and 7; a low noise amplifier 19; a detector 12 with local oscillator 17; a demodulator 13; a modulator 14; a transmitter 15 with local oscillator 17; a power amplifier 16; and channel choice logic circuitry 18. Alternative or additional transceiver circuitry could also be used depending on handset type and function.

The external DC power connectors 10 contact complimentary connectors 30 in a base station cradle adapted to receive the handset 1. The connectors 10 are connected to terminals T+ and T− such that the batteries are recharged when the handset 1 is in the base station cradle when not in use. Alternatively an on/off switch on the handset 1 may be employed to prevent battery 3 drainage when the handset 1 is out of the base station cradle, and not in use.

The preferred handset 1 uses one antenna arrangement 5 or 7 for transmission and the other 7 or 5 for reception. This eliminates the need and the space required for a diplexer if the battery antenna arrangement 5 was to be used for both transmission and reception. Alternatively the handset 1 may further include a diplexer to eliminate the need for the second internal antenna 7.

Figure 6:
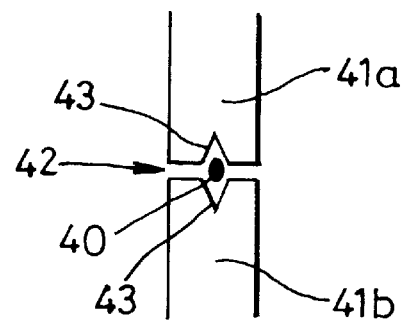
FIG. 6 shows a section detail of the split-line antenna arrangement.

Preferably the second internal antenna 7 is a simple wire element located at the opposite end of the PCB 2 to the battery antenna arrangement 5. In a further alternative, the second internal antenna 7 is located in the split line 42 of the two half casing components 41a and 41b of the handset 1 as shown in FIG. 6. The wire element 40 is accommodated within recesses 43 within each casing component 41a and 41b which when joined at the split line 42 form a cavity housing the wire 40.

The reception circuitry of the handset 1 includes matching circuitry 11 connected to terminal $T_{rf}$ which in turn is connected to a low noise amplifier 19 which boosts the received signal. The amplifier is connected to a detector 12 which mixes the received RF signals with a locally generated frequency from a local oscillator 17 to produce an intermediate frequency signal. The channel choice logic circuitry 18 is used to determine the best receive channel frequency and controls the local oscillator 17 accordingly. The demodulator 13 demodulates the intermediate frequency signal to obtain a voice signal which is then fed to the speaker unit 9. Preferably the handset 1 uses frequency modulation although a digital arrangement incorporating signal processing circuitry could also be used. The receive circuitry will also include amplification and additional matching as required.

For cellular applications of the invention, the handset 1 will also include call management circuitry for channel allocation and power reduction circuitry for the transmission circuitry.

The transmission circuitry of the preferred handset 1 includes a modulator 14 which modulates voices signals received from the microphone unit 8 and which is connected to a transmitter 15. The transmitter 15 mixes the modulated signal with the output of a local oscillator 17 to produce the RF signal output of the handset 1. The local oscillator 17 is controlled by channel choice logic circuitry 18 which ensures that the receive channel and transmit channel of the handset 1 are paired in a predetermined manner. The RF signal is amplified by the power amplifier 16 before being fed to the second internal antenna 7 via matching circuitry 11.

While the preferred handset 1 has been described using the battery antenna arrangement 5 for receiving RF signals and the second internal antenna 7 for transmitting RF signals, the reverse is equally applicable. As described above, the battery antenna arrangement 5 may also be used for both receive and transmit functions by the inclusion of a diplexer in the handset 1.

As a further alternative the preferred handset 1 may include a key pad for dialling together with associated signal processing and modulation circuitry.

The battery antenna structure 5 of the handset 1 may be further extended by combining the antenna length of the batteries 3 and leads 4 with that of a conductive track or wire (not shown) connected to the end of the batteries 3.

In use RF signals are transmitted and/or received using the batteries 3 and leads 4 as at least part of a monopole antenna 5, the RF signals being isolated from the handset's DC supply terminals T+ and T– by inductors L1 and L2. The RF signals pass to and/or from the handset's transceiver circuitry terminal $T_{rf}$ via capacitors C1 and C2 which also block the DC component of the batteries 3 from $T_{rf}$.

Figure 3:
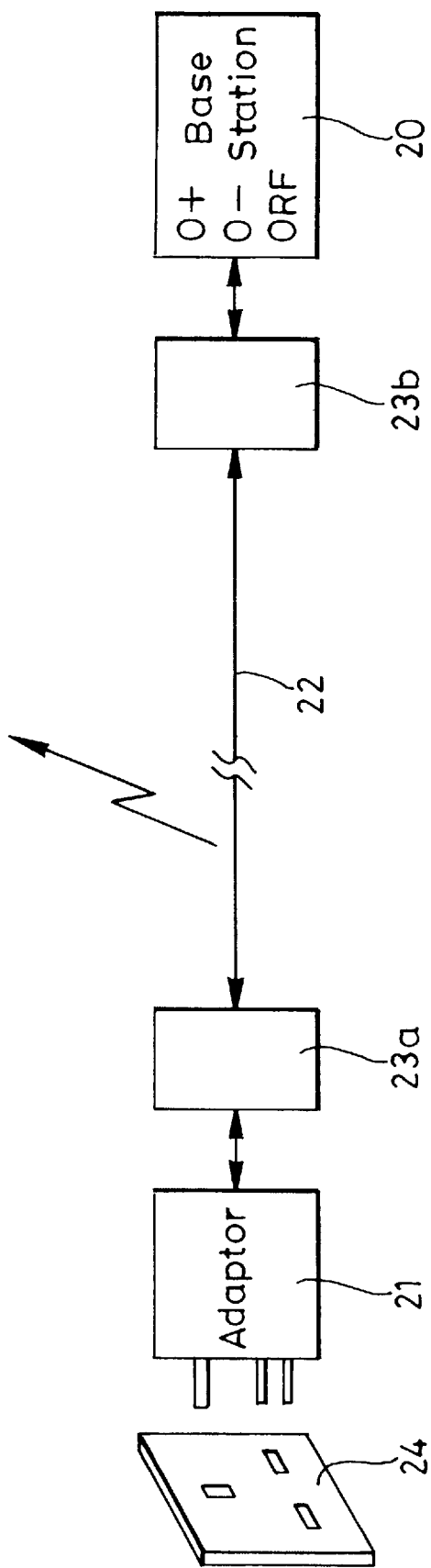
FIG. 3 shows a cordless phone base station antenna arrangement of the invention.

FIG. 3 shows a block diagram for a base station antenna arrangement of the invention. The arrangement includes the base station 20, an adaptor 21 for supplying low voltage dc power from the mains supply 24, a power supply cable 22 connecting the base station 20 and adapter 21, and RF and DC isolating circuitry 23a and 23b. The RF isolating circuitry 23 is installed at either end of the cable 22 to isolate RF signals from the adaptor 21 and hence the mains power supply 24, and from the DC power supply for the base station 20. The DC isolating circuitry 23 is installed at the base station end of the cable 22 to isolate DC voltage from the RF input/output of the base station.

Figure 4:
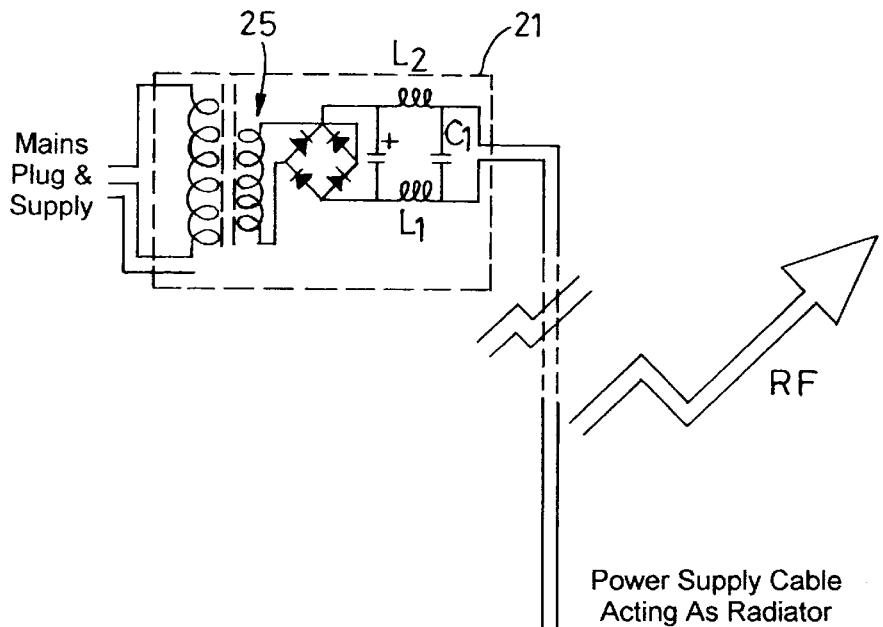
FIG. 4 shows a preferred circuit diagram of the base station antenna arrangement.
Figure 4:
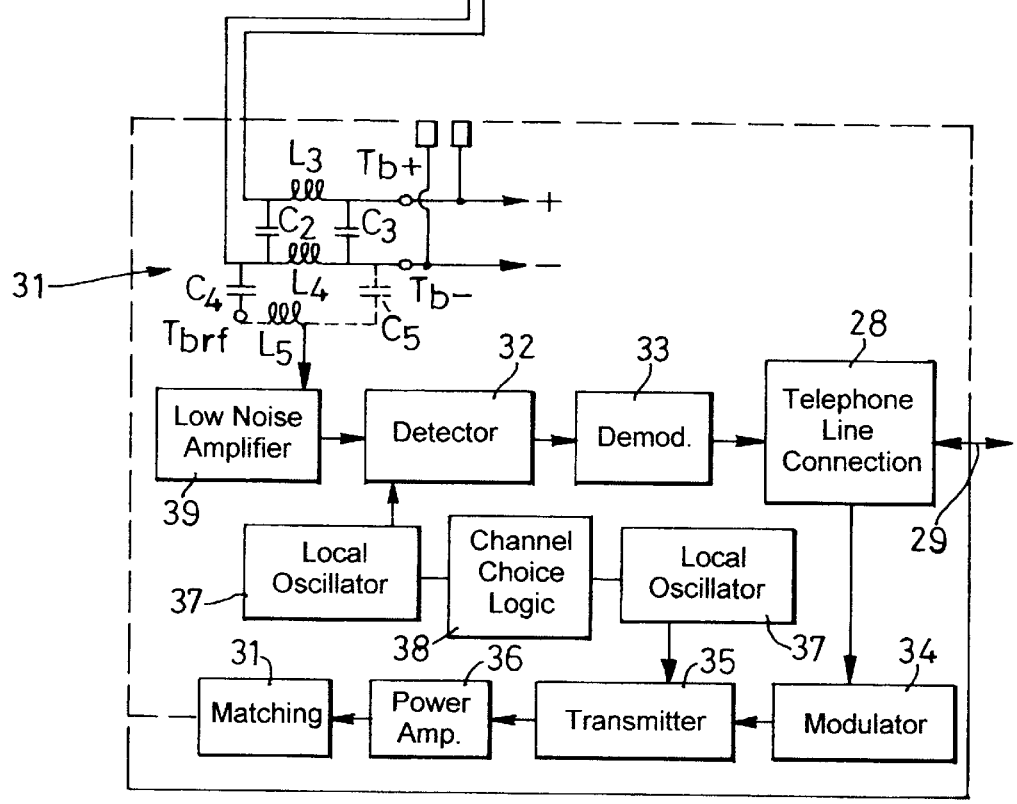

The RF and DC isolating circuitry 23a and 23b may be incorporated into the adaptor 21 and/or base station 20 as is shown in FIG. 4, or the circuitry 23 may be separate and connectable as shown in FIG. 3.

The cable 22 is preferably twin core although other types of cable could be used for example 3-core, multicore and coaxial cables.

FIG. 4 shows a preferred base station circuit diagram. The adaptor 21 includes a transformer and rectifying arrangement 25 as is known, and in addition includes an RF isolating and phase core equalising network L1, L2 and C1. Inductors L1 and L2 form part of the RF isolating circuitry 23a which isolates RF signals from the transformer 25 and hence the mains supply 24. Capacitor C1 and its complimentary capacitor C2 in the base station 20 are RF shorting capacitors which ensure that both cores of the power supply cable 22 are at the same RF potential and hence that they radiate in-phase. As a further alternative, only one of the cores might be used as the antenna, hence dispensing with the need for C1 and C2.

The RF isolating circuitry 23b of the base station includes L3, L4 and C3 which isolate RF signals from the base station DC supply terminals Tb+ and Tb–. The DC isolating circuitry 23b includes a DC isolating capacitor C4 which allows RF signals to pass to an RF input/output terminal $Tb_{rf}$ while isolating DC voltage.

The preferred base station 20 also includes matching components C5 and L5 which form an L network to match the impedance of the cable antenna 22 the base station's transceiver circuitry. Alternative matching circuits could also be used such as T and pi networks for example.

The preferred base station 20 includes an internal antenna 40 which is incorporated in the split line of the base station's casing components as described below with reference to FIGS. 5 and 6. The cable antenna 22 is then used for transmit or receive functions and the internal antenna 40 for the complimentary function. Alternatively the cable antenna 22 may be used for both transmit and receive, the base station then including a diplexer.

The preferred base station 20 also includes external DC connectors 30 which contact complimentary contacts 10 on the handset 1 when the handset 1 is resting in a cradle (not shown) in the base station 20 The external DC connectors 30 are connected to the base station 20 DC supply terminals Tb+ and Tb– which supply the handset 1 with DC power when in the cradle.

The preferred base station also includes cordless phone transceiver circuitry including: a low noise amplifier 39; a detector 32 with local oscillator 37; a demodulator 33; a telephone line connection 28 connecting to a telephone line 29; a modulator 34; a transmitter 35 with local oscillator 37; channel choice logic circuitry 38; a power amplifier 36; and matching circuitry 31 to the split line antenna 40. The operation of this transceiver circuitry is analogous to that of the handset 1 described above, voice signals being received/transmitted over the telephone line 29 instead of the microphone 9 and speaker 8 of the handset 1. Additional matching and amplification circuitry will also be included as is required.

The reception circuitry of the base station 20 includes matching circuitry 31 connected to terminal $Tb_{rf}$ which in turn is connected to a low noise amplifier 39 which boosts the received signal. The amplifier 39 is connected to a detector 32 which mixes the received RF signals with a locally generated frequency from a local oscillator 37 to produce an intermediate frequency signal. The channel choice logic circuitry 38 is used to determine the best receive channel frequency and controls the local oscillator 37 accordingly. The demodulator 33 demodulates the intermediate frequency signal to obtain a voice signal which is then fed to the telephone line connection circuitry 28 which is connected to a telephone line 29. Preferably the base station 20 uses frequency modulation although a digital arrangement incorporating signal processing circuitry could also be used. The receive circuitry will also include amplification and additional matching as required.

The transmission circuitry of the preferred base station 20 includes a modulator 34 which modulates voices signals received from the telephone line connection circuitry 28 and which is connected to a transmitter 35. The transmitter 35 mixes the modulated signal with the output of a local oscillator 37 to produce the RF signal output of the base station 20. The local oscillator 37 is controlled by channel choice logic circuitry 38 which ensures that the receive channel and transmit channel of the base station 20 are paired in a predetermined manner which is also employed in the handset 1. The RF signal is amplified by the power amplifier 36 before being fed to the internal antenna 40 via matching circuitry 31.

In use RF signals are transmitted and/or received using the cable 22 as an antenna structure, the RF signals being isolated from the adapter by inductors L1 and L2 and from the base station DC supply terminals Tb+ and Tb– by inductors L3 and L4 and capacitor C3. The RF signals pass to and/or from the transceiver circuitry via capacitor C4 which also isolates the DC component of the supply cable 22.

Figure 5:
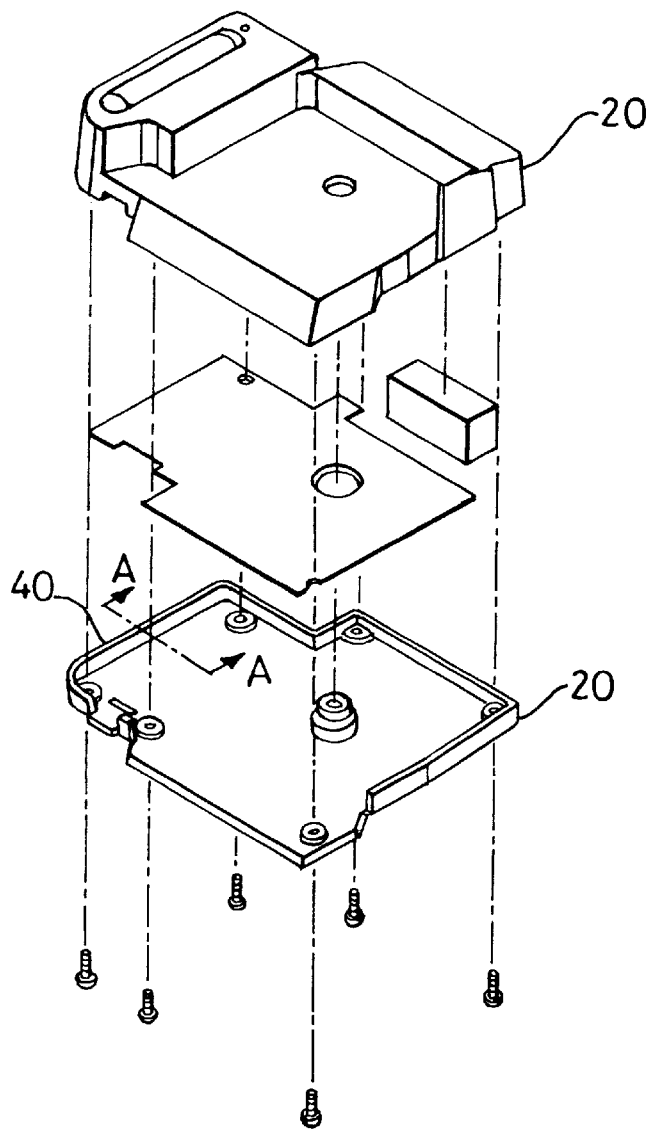
FIG. 5 shows a cordless phone handset antenna wire arrangement using the handsets split-line

With reference to FIGS. 5 and 6 an antenna 40 is located in the split line 42 of the base station casing components 41a and 41b as shown. Analogously, a second internal antenna 7 within the handset 1 could be located in the split line 42 of the handset casing components 41a and 41b. The use of these additional antennas allows the battery antenna 5 of the handset 1 and the cable antenna 22 of the base station 20 to be used for transmit or receive only functions.

The preferred handset 1 and base station 20 are made up substantially of two casing components 41a and 41b which are joined together to form the outer casing 1 and/or 20 for containing the circuitry of each device. The surface of each component 41a and 41b at the split line 42 includes a recess 43 to accommodate an antenna wire 40 or 7 such that the antenna 40 or 7 is located around the edge of the handset 1/base station 20.

This arrangement provides an internal antenna 40 or 7 which requires minimal internal space but which provides a larger internal antenna than prior art systems. The arrangement allows the split line antenna arrangement 40 or 7 to be used in addition to the battery or cable antennas 5 or 22 such that they provide complimentary transmit and receive functions. This allows each internal antenna to be optimised for a specific function (transmission or reception) and removes the need for a diplexer which further reduces size requirements of the handset 1 and base station 20.

Other embodiments of the split line antenna 40 or 7 are possible, for example, the use of a recess 43 on only one face of the split line 42 in only one casing component 41a or 41b. Different shaped recesses could also be used.

Advantageously, the handset and base station antenna arrangement 5 and 22 of the invention are used together. Preferably the cable antenna 22 of the base station 20 is used for receiving RF signals and the split line antenna 40 is used for transmitting RF signals. Preferably the battery antenna arrangement 5 of the handset 1 is used for receiving RF signals and the second internal antenna 7 is used for transmitting RF signals.

The foregoing describes the invention including preferred forms thereof. Alterations and modifications as will be obvious to those skilled in the art are intended to be incorporated within the scope hereof.

What is claimed is:

1. A radio communications handset comprising:
   RF isolating circuitry arranged to isolate RF signals present on a battery from a positive and a negative handset supply terminal;
   DC isolating circuitry arranged to isolate DC voltage present on the battery from a handset RF terminal;
   transceiver means which is powered from the positive and negative handset supply terminals and which transmits and/or receives RF signals to/from the handset RF terminal;
   wherein the battery when fitted is incorporated as part of a monopole antenna arrangement within the handset.

2. A radio communications handset as claimed in claim 1, wherein the RF isolating circuitry comprises an RF isolating inductor and the DC isolating circuitry comprises a DC isolating capacitor.

3. A radio communications handset as claimed in claim 1, wherein the transceiver means comprises a diplexer.

4. A radio communications handset as claimed in claim 2 further comprising a second internal antenna arrangement.

5. A radio communications handset as claimed in claim 4, wherein the second internal antenna arrangement comprises an antenna element; and wherein the handset further comprises at least two casing components joined to form a slit line at said join, at least one said casing component comprising a recess located at said split line which accommodates said antenna element.

6. A radio communications handset as claimed in claim 5, the handset further comprising:
   a microphone unit;
   a speaker unit; and
   external DC power connectors.

7. A radio communications handset as claimed in claim 6, wherein the transceiver means comprises:
   antenna matching circuitry;
   detector circuitry;
   demodulating circuitry;
   modulating circuitry;
   transmitter circuitry; and
   power amplification circuitry.

8. A radio communications system comprising:
   a radio communications handset comprising:
      RF isolating circuitry arranged to isolate RF signals present on a battery from a positive and a negative handset supply terminal;
      DC isolating circuitry arranged to isolate DC voltage present on the battery from a handset RF terminal;
      transceiver means which is powered from the positive and negative handset supply terminals and which transmits and/or receives RF signals to/from the handset RF terminal;
      wherein the battery when fitted is incorporated as part of a monopole antenna arrangement within the handset; and
   a radio communications base station comprising:
      RF isolating circuitry arranged to isolate RF signals present on an LV power supply cable from a positive and a negative base station supply terminal and from a connection at the non-base station end of said cable;
      DC isolating circuitry arranged to isolate DC voltage present on the cable from a base station RF terminal;
      transceiver means which is powered from the positive and negative base station supply terminals and which transmits and/or receives RF signals to/from the handset RF terminal;
      wherein the LV cable when fitted is incorporated as part of an antenna arrangement of the base station;
   and wherein said handset and said base station communicate by transmitting and/or receiving RF signals using said battery and said cable.

9. A method of operating a radio communications handset comprising:
   a battery;
   RF isolating circuitry arranged to isolate RF signals present on the battery from a positive and a negative handset supply terminal;
   DC isolating circuitry arranged to isolate DC voltage present on the battery from a handset RF terminal;
   transceiver means which is powered from the positive and negative handset supply terminals and which transmits and/or receives RF signals to/from the handset RF terminal;
   the method comprising the step of using the battery as part of a monopole antenna arrangement within the handset to receive and/or transmit RF signals.

* * * * *